Feb. 27, 1934.  G. W. HARDIN  1,949,304
AIRCRAFT
Filed July 30, 1932   3 Sheets-Sheet 2
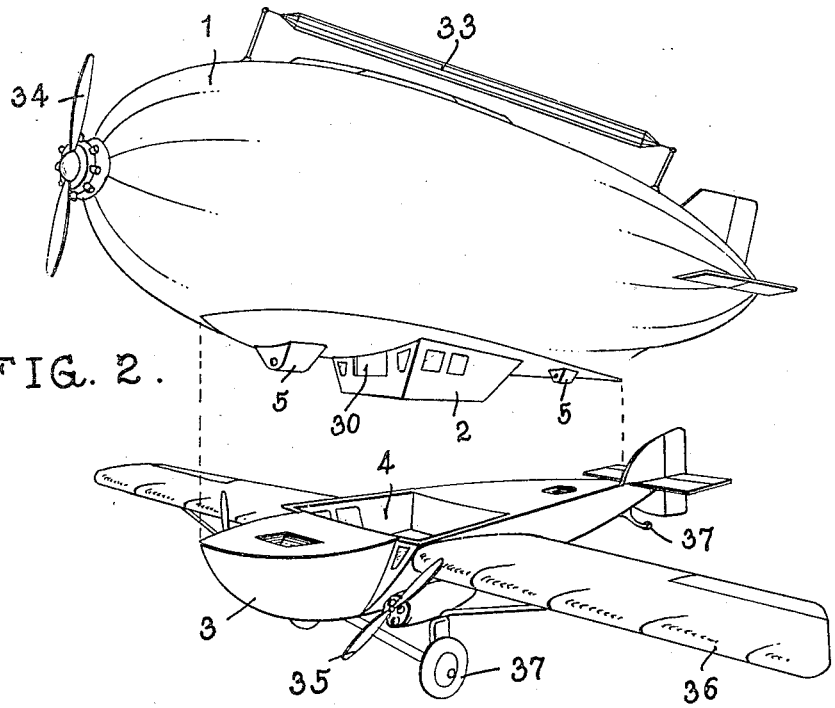
FIG. 2.
FIG. 4
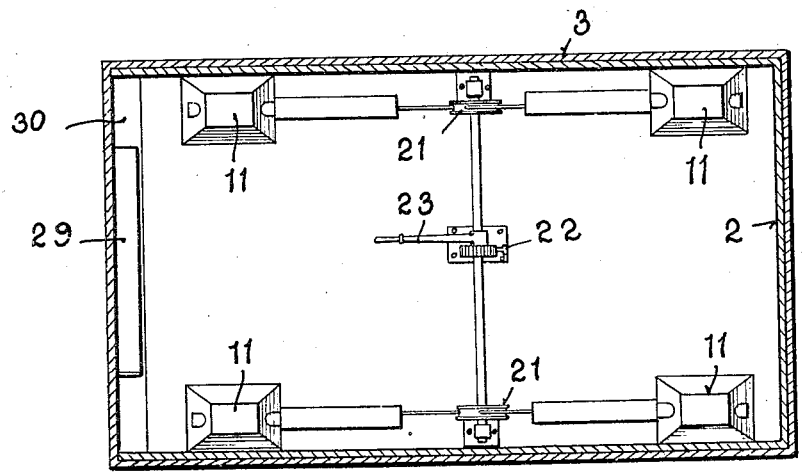
INVENTOR
George W. Hardin
BY Dye & Kirchner
ATTORNEYS

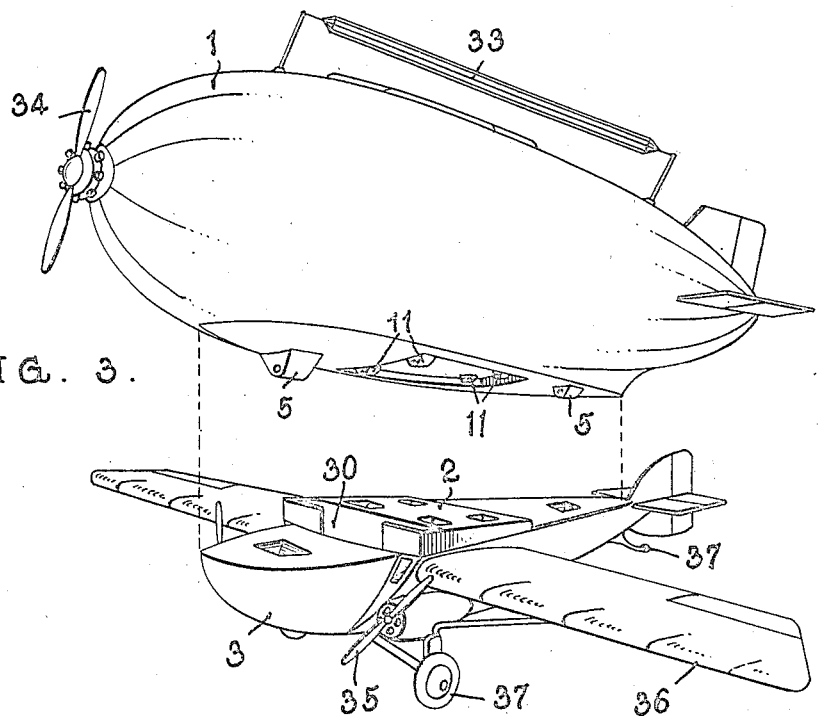
FIG. 3.
FIG. 5.
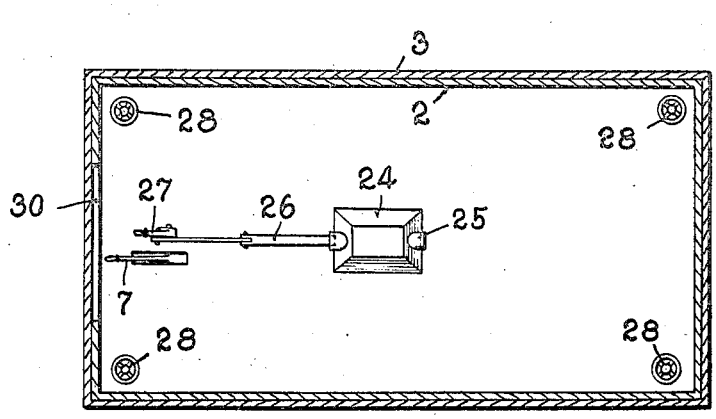

Patented Feb. 27, 1934

1,949,304

UNITED STATES PATENT OFFICE 1,949,304

AIRCRAFT

George W. Hardin, Greeneville, Tenn.

Application July 30, 1932. Serial No. 626,955

10 Claims. (Cl. 244—3)

My invention relates to improvements in aircraft of the Hardin type, i. e., aircraft including a heavier-than-air fuselage, a lighter-than-air gas bag, and a pilot-carrying cabin connected to the gas bag, normally received within the fuselage, the gas bag and the fuselage being normally connected together but being separable upon failure of the fuselage, to permit separation of the gas bag and the cabin from the fuselage and sustention of the gas bag and the cabin in the air independent of the fuselage, all as taught by United States Letters Patent No. 1,754,211, granted to me on April 8, 1930.

The invention described in my above identified Letters Patent contemplates a separable connection interposed between the fuselage and the gas bag, and makes no provision for detaching the cabin from the gas bag. The present improvement provides a separable connection interposed between the gas bag and the cabin, and has for its object the provision of means in the aircraft for releasing the gas bag from the cabin and from the fuselage.

I have found that under certain emergency conditions it may become necessary to rid the craft of the gas bag. Thus, should the gas bag become disabled, by reason of rupture or puncture, or diminution of its gas supply to a point where the buoyancy of the gas is insufficient to support the weight of the cabin, it is obvious that the gas bag no longer serves a useful purpose. This contingency is particularly liable to arise in the case of combat aircraft operating in war time. In such a case it is obviously desirable to free the craft of the useless or inefficient gas bag and fly the fuselage, including the cabin, as a strictly heavier-than-air craft.

Further objects of the invention are to provide means for effecting a secure connection of the cabin to the body of the fuselage, normally left open during flight of the combined craft, but adapted to be closed upon release of the gas bag.

A further object of the present invention is to provide connections which will function unfailingly, efficiently, and with a minimum of effort and in a minimum of time.

Another important object of the invention is to provide a combined craft including fuselage, gas bag and cabin, in which the cabin is alternatively disengageable from the fuselage and the gas bag, and in which two independent sets of controls are provided, one for the gas bag and the cabin independent of the fuselage, and one for the fuselage and the cabin independent of the gas bag, each set of controls being secured to a portion of the element whose flight it governs, and both sets being normally accessible from within the cabin. The effect of this arrangement is to enable the pilot of the combined craft to control the power, lift, and steering means of both the fuselage and the gas bag when both of these elements are united to the cabin, and to control either group of means when the other element is disconnected from the cabin.

Other and further objects and advantages of the invention will be readily understood from the accompanying drawings which form part of this application for Letters Patent and from the detailed description herein.

In the accompanying drawings,

Fig. 2 is a perspective view showing the gas bag and cabin in connected relation ascending together from the released fuselage;

Fig. 3 is a perspective view showing the fuselage and cabin in connected relation descending from the released gas bag;

Fig. 4 is a horizontal section through the upper zone of the cabin, looking upwardly and taken along the line 4—4 of Fig. 1;

Fig. 5 is a horizontal section through the lower zone of the cabin looking downwardly and taken along the line 5—5 of Fig. 1; and Fig. 6 is a longitudinal and vertical sectional detail of one of the connectors shown in Figs. 1 and 4 for securing the cabin to the gas bag.

Figure 1:
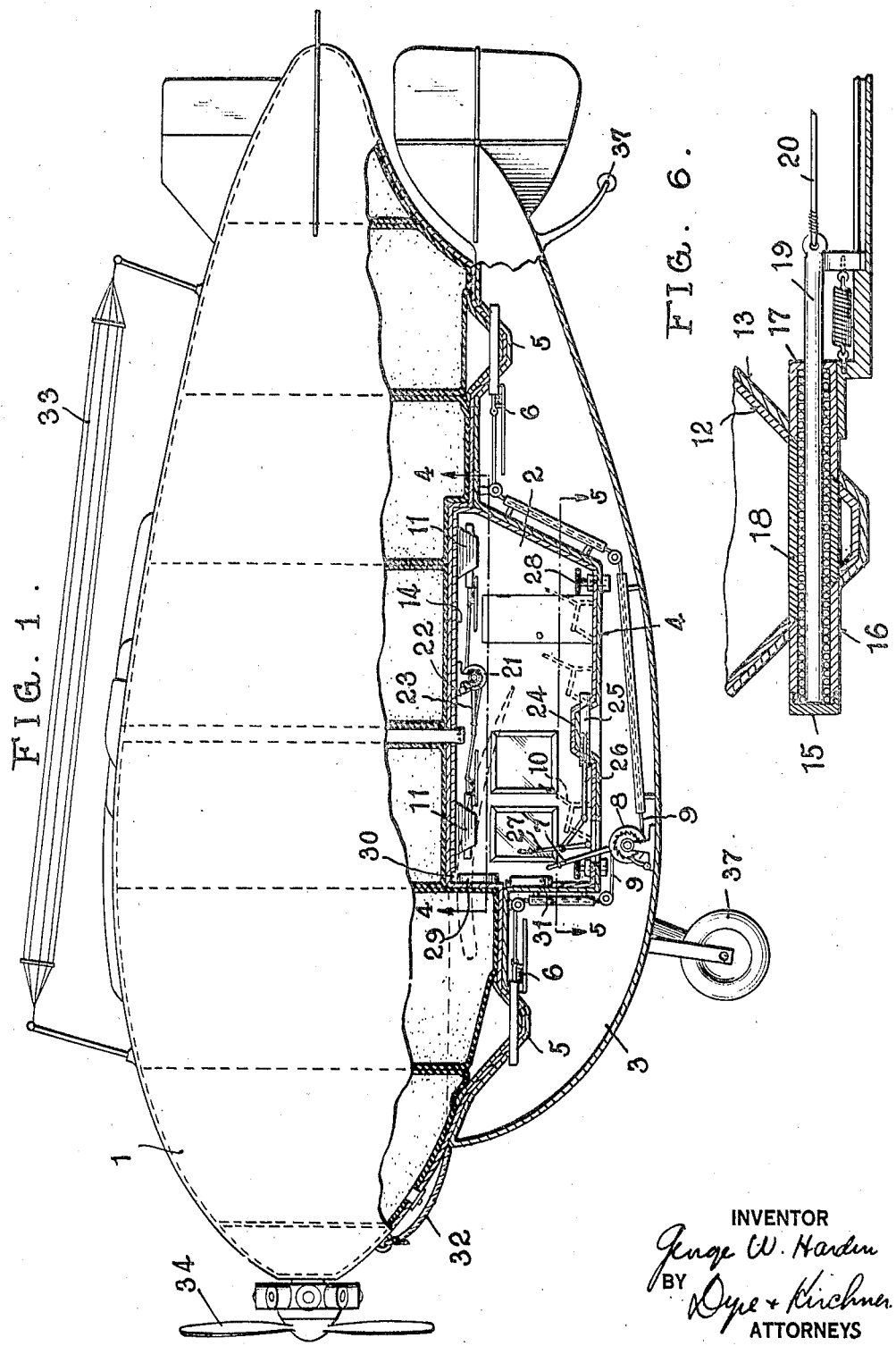
Figure 1 is a side elevational view, partly in longitudinal section, of an aircraft embodying the principles of the present invention.

Referring now to the drawings, and first to Fig. 1, the reference numeral 1 designates generally a lighter-than-air envelope adapted to be inflated to have a buoyancy sufficient to sustain aloft itself and a cabin 2 adapted to carry a pilot and passengers or other valuable load. A fuselage 3 is recessed at 4 to receive the cabin, and the envelope and cabin are provided with connectors 5,5 for securing the gas bag and fuselage normally together. The structure of these connectors 5, 5, and of the retractible pins 6, 6, and of the actuating lever 7 for withdrawing the pins to disconect the gas bag from the fuselage, is all explained in my prior patent. It will be recalled that actuation of the lever 7 imparts unidirectional rotation to a drum 8 on which are wound cables 9, 9, connected to the pins 6, 6. The lever 7 is mounted in the floor of the fuselage and extends through registering openings in the indented upper surface of the fuselage and the floor of the cabin, at a point where it may be conveniently reached from the pilot's seat 10.

A fundamental difference between the disclosure in my prior patent and the principles of the present invention is that the former shows no separable connection between the cabin and the gas bag, while the present invention includes connectors 11, 11, for effecting this separable connection. These connectors, as shown in detail in Fig. 6, may be similar in structure to the connectors 5, 5. It will be noted that they include a projection 12 firmly secured to the structure of the bag and a complemental recess 13 formed in and forming part of the roof 14 of the cabin. A tube 15 has two separate end portions 16 and 17 secured respectively to opposite sides of the cabin roof recess 13 and a separate center portion 18 secured to the gas bag projection 12. The three parts of the tube 15 are adapted to be aligned when projection 12 and recess 13 are interfitted, and when so aligned are adapted to receive a pin 19 effecting a very secure connection of the projection and the recess and consequently of the bag and the cabin. Cables 20, 20, connect the pins 19 and a common drum 21 which is rotatable unidirectionally by a pawl 22 and lever 23, all mounted on the roof of the cabin with the lever normally parallel with and close to the roof. Pins 19 are normally seated completely within tube 15 to close connectors 11, so that the cabin is normally secured to the gas bag, as in the case of my original aircraft. However, it will be obvious that in the present instance manipulation of lever 23 will serve to release the cabin from the gas bag, for a purpose hereinafter more specifically explained.

In order to provide increased head room in the cabin to accommodate connectors 11 and their operating gear, the cabin is preferably made relatively high, with its upper zone extending above the top of the fuselage and received within a recess formed in the lower part of the gas bag.

The recessed top 4 of the fuselage and the floor of the cabin are respectively projected and indented to provide a connector 24 including a 3-part tube 25, and a retractible pin 26 movable by a lever 27 mounted in the floor of the cabin close to the pilot's seat 10. The details of connector 24 may be identical with those of connectors 5 and 11, and need not be specifically described. The function of the connector 24 is to provide a separable connection for the cabin and the fuselage, operable by manipulation of lever 27, and this connection is normally open, as shown in Fig. 1.

Supplemental connectors 28, 28, may be provided for the cabin and the fuselage in the four corners of the cabin floor. These connectors may be of any type, e. g., the screwthreaded means operable by hand wheels shown in the drawings. These connectors 28 are normally open.

It will be obvious that under normal conditions of flight the condition of connectors 5, 11, 24 and 28 is such that the gas bag is secured to the fuselage and the cabin is secured to the gas bag, there being no direct connection of the cabin and the fuselage, although these two elements are indirectly connected through the medium of the gas bag. The three elements, gas bag, cabin and fuselage, are thus united for flight together. Upon failure of the motors, exhaustion of fuel supply, or the impossibility of normal flight by reason of any other failure of the fuselage or its appurtenant parts, it is only necessary for the pilot to actuate lever 7, opening connectors 5, 5, to release the useless fuselage and permit the cabin to be carried aloft by the gas bag to which it is secured by connectors 11.

If, however, the gas bag should fail because of loss of its gas or for any other reason, the gas bag may be released and flight continued by the associated fuselage and cabin by manipulation of lever 23 to open connectors 11, manipulation of lever 27 to close connector 24 and manipulation of lever 7 to open connectors 5. By practice of these three operations the cabin will be released from the gas bag, the cabin will be secured to the fuselage, and the gas bag will be released from the fuselage. The fuselage with its cabin will then function as an ordinary heavier-than-air craft, as suggested by Fig. 3. After release of the gas bag, supplemental connectors 28 may be closed at the leisure of the pilot to reinforce the connection of the cabin to the fuselage afforded by connector 24.

It will be observed that the invention contemplates the association with the fuselage and gas bag, as described in my prior patent, of a cabin which is floating, i. e., alternatively engageable with the gas bag and the fuselage. In order to permit the pilot to control his flight after release of the fuselage, should the gas bag be of the dirigible type, I prefer to mount the controls of the dirigible gas bag in position on a portion of the structure of the bag, designated generally 29 in Fig. 1. These controls extend normally through an opening 30 in the upper forward part of the cabin, so that they are accessible from within the cabin when the cabin and the gas bag are united and the fuselage is released, and may be carried off with the gas bag when the cabin and fuselage are united and the gas bag is released. All connections between the motors, ailerons, elevators, radio apparatus, etc., of the dirigible bag and the dirigible controls 29 are of course carried strictly within the bag and do not at any point pass through the fuselage.

Controls for the fuselage are mounted collectively at an area 31 on a portion of the fuselage which extends through the lower part of opening 30 in the front wall of the cabin. It will be obvious that connections between these controls and the motors, empennage, etc., of the fuselage at no point pass through the gas bag, so that upon release of the fuselage from the connected gas bag and cabin, the controls 31 will be carried off with the fuselage.

It will thus be obvious that a preferred embodiment of my invention contemplates providing two distinct sets of controls, one for the gas bag, and the other for the fuselage, each set of controls being mounted on a part of the element to which it relates, and both being accessible from within the cabin through an opening therein.

It will be obvious that various supplementary features may be incorporated in the craft, as is well understood in the art. Thus, a mooring rope 32, radio antennæ 33, a motor driven propeller 34, and other appurtenances may be included in connection with the gas bag, while any useful type of propellers 35, wings 36, landing gear 37, 37, etc., may be included as part of the fuselage.

In this specification and in the appended claims I have used the words "gas bag" to designate as an entirety the lighter-than-air element of my combined craft, including its assembly of gas cells, envelope, controls, power and signalling equipment, etc. Similarly, the word "fuselage" signifies the heavier-than-air element or airplane, including the fuselage proper, its wings, controls, power means, landing gear, etc.; and the word "cabin" refers to the car or compartment adapted to carry the pilot, passengers and other valuable load, it being understood that some freight of relatively low value and importance, may, if desired, be carried in the fuselage proper outside of the cabin. The term "aircraft of the Hardin type" or its equivalent used in the appended claims is to be understood as denoting an aircraft having the essential structure taught by my prior Patent No. 1,754,211, as set forth in the first paragraph of this present specification.

It will be obvious that the invention is not concerned with the specific type of gas bag assembly which forms one of its three principal elements. Thus, this element may be a rigid or a non-rigid balloon, of any appropriate shape, dimensions and general specifications. Again, the heavier-than-air element may be of any approved type, both as to structure, design, power means, etc. It is also to be understood that the invention has been hereinabove illustrated in one preferred form of embodiment only, merely for purposes of exemplification and not limitation. The invention is capable of embodiment in other and further modified forms, and all such modifications, to the extent that they embody the principles of the invention as pointed out in the appended claims, are to be deemed within the scope and purview thereof.

I claim:

1. An aircraft including a dirigible gas bag assembly and control actuating means therefor mounted on a part of the gas bag assembly, a heavier-than-air airplane and control actuating means therefor mounted on a part of the airplane, a cabin common to the gas bag assembly and the airplane, and connector means for uniting the gas bag assembly, the cabin and the airplane for flight together, for uniting the cabin and the gas bag assembly for flight together independent of the airplane, and for uniting the cabin and the airplane for flight together independent of the gas bag assembly, the two sets of control actuating means being independently accessible from within the cabin when the gas bag assembly, the cabin and the airplane are united for flight together.

2. An aircraft including a dirigible gas bag assembly and control actuating means therefor mounted on a part of the gas bag assembly, a heavier-than-air airplane and control actuating means therefor mounted on a part of the airplane, a cabin common to the gas bag assembly and the airplane provided with an opening in a wall thereof, and connector means for uniting the gas bag assembly, the cabin and the airplane for flight together, for uniting the cabin and the gas bag assembly for flight together independent of the airplane, and for uniting the cabin and the airplane for flight together independent of the gas bag assembly, the two sets of control actuating means being accessible from within the cabin through said opening when the gas bag assembly, the cabin and the airplane are united for flight together.

3. In an aircraft of the type which includes a gasbag, a fuselage and a cabin carried by the gasbag, the cabin being sustainable by the gasbag when the fuselage is disconnected therefrom, the fuselage having an open recess, the cabin carried in the recess connected to the gasbag, means for disconnecting the cabin from the gasbag and the fuselage from the gasbag, and means for connecting the cabin to the fuselage.

4. An aircraft of the type which includes a gasbag, a fuselage and a cabin carried by the gasbag, the cabin being sustainable by the gasbag when the fuselage is disconnected therefrom, said cabin being normally connected to the gasbag and received within the fuselage, means normally connecting the fuselage to the gasbag, means for disengaging the cabin from the gasbag and the gasbag from the fuselage, and means for positively connecting the cabin to the fuselage.

5. An aircraft as claimed in claim 4, in which the means for positively connecting the cabin to the fuselage includes a plurality of independent connectors.

6. In an aircraft of the type which includes a gasbag, a fuselage and a cabin carried by the gasbag, the cabin being sustainable by the gasbag when the fuselage is disconnected therefrom: means for normally connecting the cabin to the gasbag, means for normally connecting the gasbag to the fuselage, means for disengaging the cabin from the gasbag and the gasbag from the fuselage, and means for positively connecting the cabin to the fuselage including a first connector provided with an actuating element readily accessible from the pilot's position in the cabin and a second connector, independent of the first, adapted to supplement and reinforce the engagement of the cabin and fuselage afforded by operation of the first connector.

7. In an aircraft of the type which includes a gasbag, a fuselage and a cabin carried by the gasbag, the cabin being sustainable by the gasbag when the fuselage is disconnected therefrom: a connector for normally connecting the cabin to the gasbag mounted in the upper part of the cabin, means for operating said connector also mounted in the upper part of the cabin, and means normally connecting the gasbag to the fuselage including means for disengaging the cabin from the gasbag and the gasbag from the fuselage and including means for positively connecting the cabin to the fuselage.

8. In an aircraft of the type which includes a gasbag, a fuselage and a cabin carried by the gasbag, the cabin being sustainable by the gasbag when the fuselage is disconnected therefrom: a connector for normally connecting the cabin to the gasbag and actuating means therefor mounted in the upper part of the cabin, the under surface of the gasbag being recessed to receive the upper part of the cabin, whereby the effective head room in the cabin is sufficient to accommodate the connector and its actuating means, and means normally connecting the gasbag to the fuselage including means for disengaging the cabin from the gasbag and the gasbag from the fuselage and including means for positively connecting the cabin to the fuselage.

9. In an aircraft of the type which includes a gasbag, a fuselage and a cabin carried by the gasbag, the cabin being sustainable by the gasbag when the fuselage is disconnected therefrom: means rendering the cabin alternatively disengageable from the gasbag and from the fuselage, a set of gasbag control actuating means mounted on a part of the gasbag, and a set of fuselage control actuating means mounted on a part of the fuselage, both sets of actuating means being accessible from within the cabin when the cabin, gasbag and fuselage are associated together.

10. An aircraft of the type which includes a gasbag, a fuselage and a cabin carried by the gasbag, the cabin being sustainable by the gasbag when the fuselage is disconnected therefrom, in which the cabin is alternatively disengageable from the gasbag and from the fuselage and in which a set of gasbag control actuating means is mounted on a part of the fuselage, a wall of the cabin is provided with an opening, and both sets of actuating means extend through said opening into the cabin.

GEORGE W. HARDIN.